United States Patent [19]
Yu

[11] Patent Number: 6,059,386
[45] Date of Patent: May 9, 2000

[54] DETACHABLE COMPUTER CASE

[76] Inventor: Ben Has Yu, No. 14 Industry 2 Rd., Kuan Yin Industry Park, Kuan Yin Hsiang, Tao Yuan Hsien, Taiwan

[21] Appl. No.: 09/309,502

[22] Filed: May 11, 1999

[51] Int. Cl.[7] ................................................. H05K 7/18
[52] U.S. Cl. .................... 312/223.2; 312/263; 220/4.32
[58] Field of Search ............................... 312/257.1, 263, 312/265.5, 223.1, 223.2, 265.6; 361/724, 725, 726, 727, 683, 685; 220/4.32, 4.33, 345.2, 617, 622

[56] References Cited

U.S. PATENT DOCUMENTS

| | | | |
|---|---|---|---|
| 628,778 | 7/1899 | Edwards | 220/4.32 X |
| 4,621,877 | 11/1986 | Boudreau et al. | 312/257.1 |
| 5,735,411 | 4/1998 | Flamme et al. | 312/223.1 X |
| 5,964,513 | 10/1999 | Korinsky et al. | 312/223.2 |
| 5,980,003 | 11/1999 | Huang | 312/223.2 |

*Primary Examiner*—Janet M. Wilkens
*Attorney, Agent, or Firm*—Rosenberg, Klein & Lee

[57] ABSTRACT

A detachable computer case comprises a mainboard rack and a detachable board. The mainboard rack has a base, two lateral plates and a rear plate; a plurality of guiding rails formed by pressing and projecting from the upper inner wall of the lateral plates; and a plurality locking stages formed on the top side of the base by pressing and each having a locking hole therein. The detachable board is of inverted-L shape, and has a top plate and a front plate; an indent guiding groove formed by pressing on the outer wall of each lateral side of the top plate; a plurality of locking plates formed on the bottom end of the front plate. The guiding grooves on two lateral sides of the top plate of the detachable board slide backward along the guiding rails on two lateral plates of the mainboard rack, and the locking plates on the bottom end of the front plate of the detachable board are engaged to the corresponding locking holes of the mainboard rack, such that the detachable board is engaged with the mainboard rack.

3 Claims, 4 Drawing Sheets

PIROR ART

DETACHABLE COMPUTER CASE

FIELD OF THE INVENTION

The present invention relates to a detachable computer case, especially to a computer case, which facilitates the replacement, update and maintenance of computer equipment, and provides more flexibility to the space and arrangement of the mainboard plate.

BACKGROUND OF THE INVENTION

Due to the rapid development of computer technology, computer user needs to frequently update the computer equipment and related peripheral The desktop computer has larger space, therefore, the update thereof is not hindered by the space limitation. However, the smaller computer such as notebook computer has problem of limited space, the update and maintenance thereof are serious problem. Therefore, computer with detachable case is developed to overcome the problem. As shown in FIG. 1, a conventional detachable computer case comprises a mainboard rack 10a and a detachable board 11a. The mainboard rack 10a has a base 12a, the rear portion thereof is used to support computer mainboard, power supply and other equipment. The detachable board 11a is of L shape, and has a front plate 13a as the front panel of computer and a bottom plate 14a to mount hard disk, floppy disk or CDROM driver. The detachable board 11a is engaged to the mainboard rack 10a to form an integral case structure. However, in above case, the detachable board 11a is of inverted-L shape such that the bottom plate 14a of the detachable board 11a will occupy considerable area on the front region of the base 12a of the mainboard rack 10a. The computer components such as computer mainboard, power supply and other equipment can only be arranged on the rear region of the base 12a of the mainboard rack 10a.

The present invention provides a computer case, which facilitates the replacement, update and maintenance of computer equipment. The detachable thereof is of inverted-L shape, i.e., adopts a bottom-less design. The detachable board will not occupy the front portion of the base of the mainboard rack when being engaged with the mainboard rack. Therefor, the present invention provides more flexibility to the space and arrangement of the mainboard plate.

The various objects and advantages of the present invention will be more readily understood from the following detailed description when read in conjunction with the appended drawing, in which:

DETAIL DESCRIPTION OF PREFERRED EMBODIMENT

Figure 1:
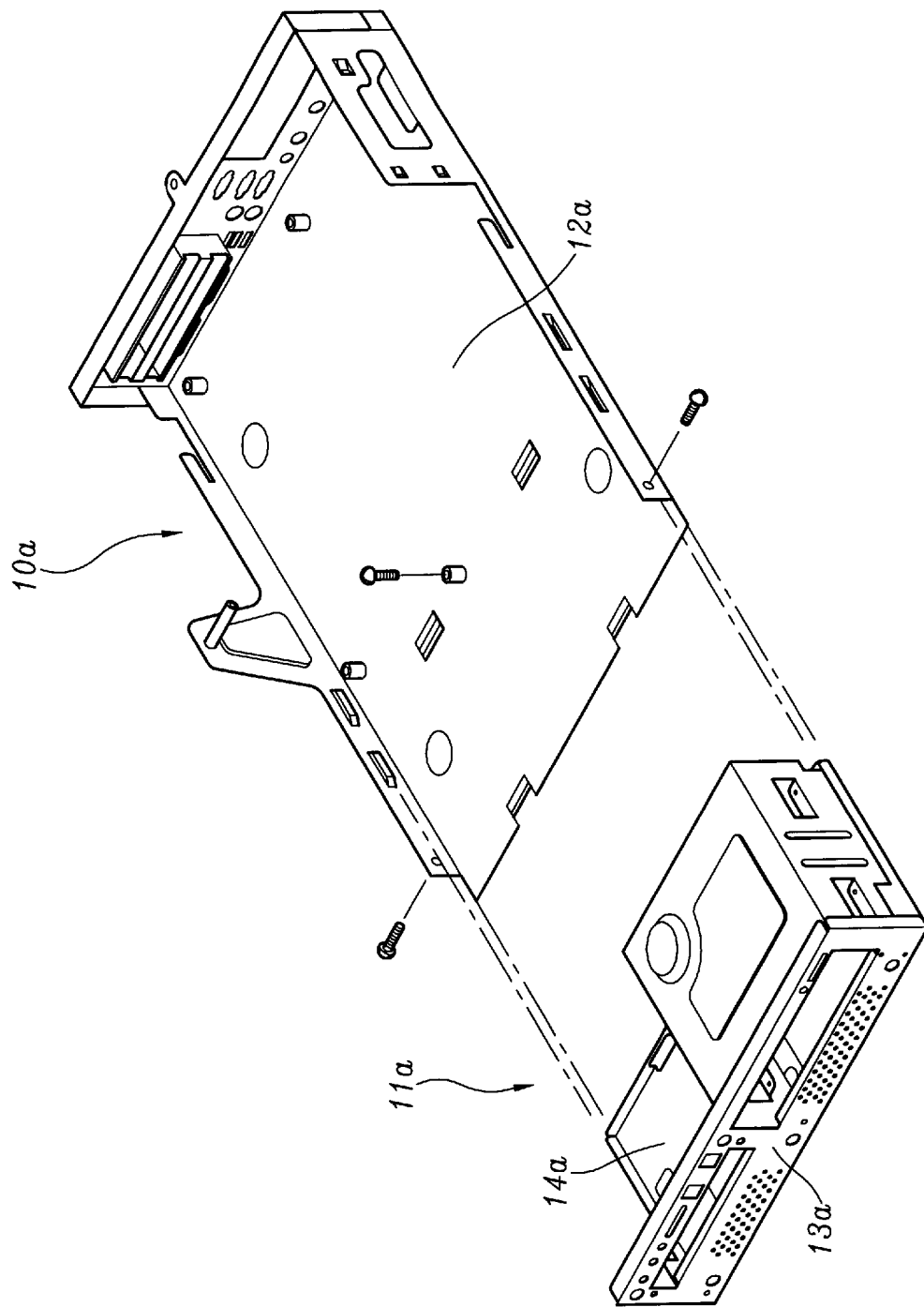
FIG. 1 shows the exploded view of a conventional computer case.
Figure 2:
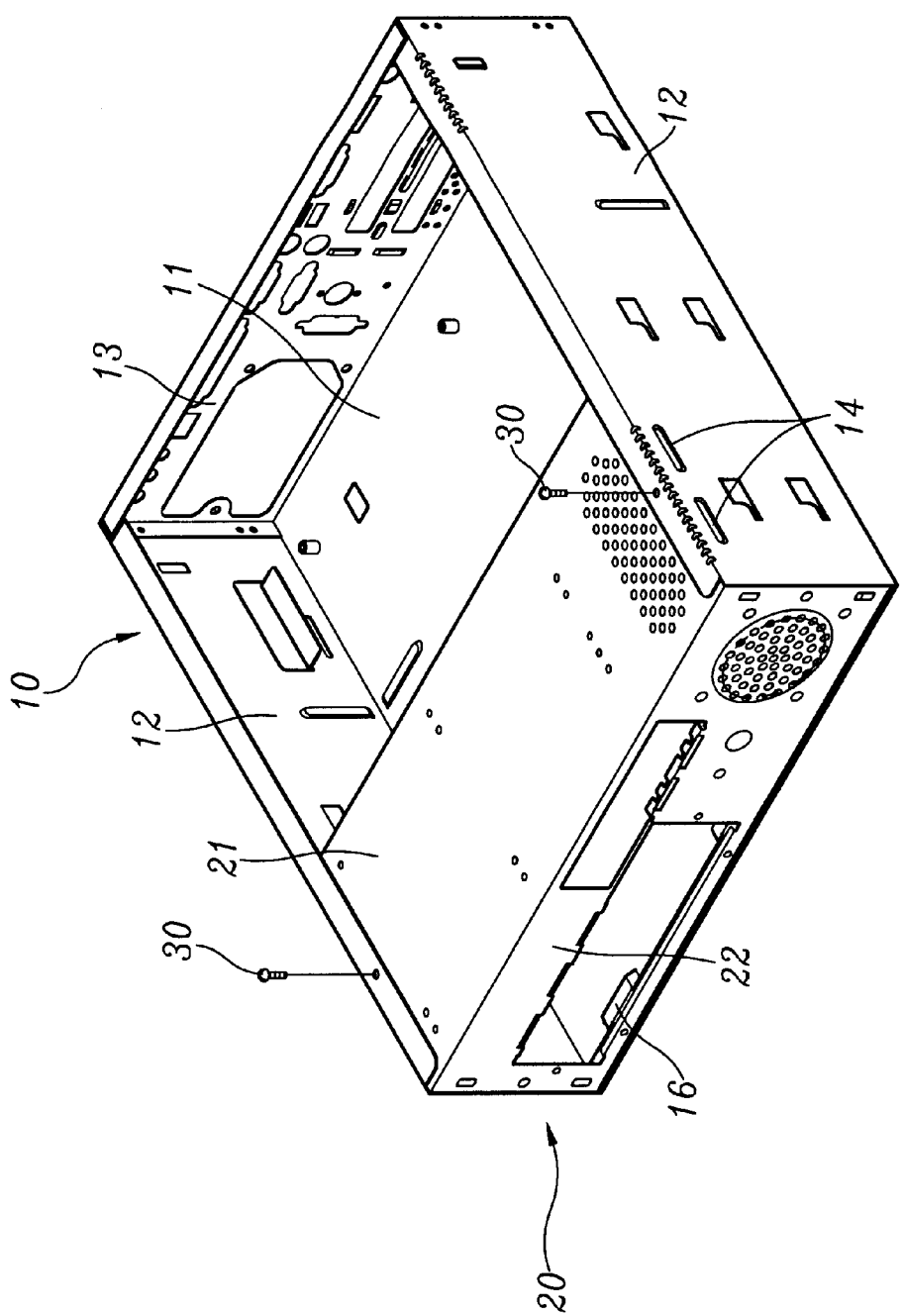
FIG. 2 shows the perspective view of the invention
Figure 3:
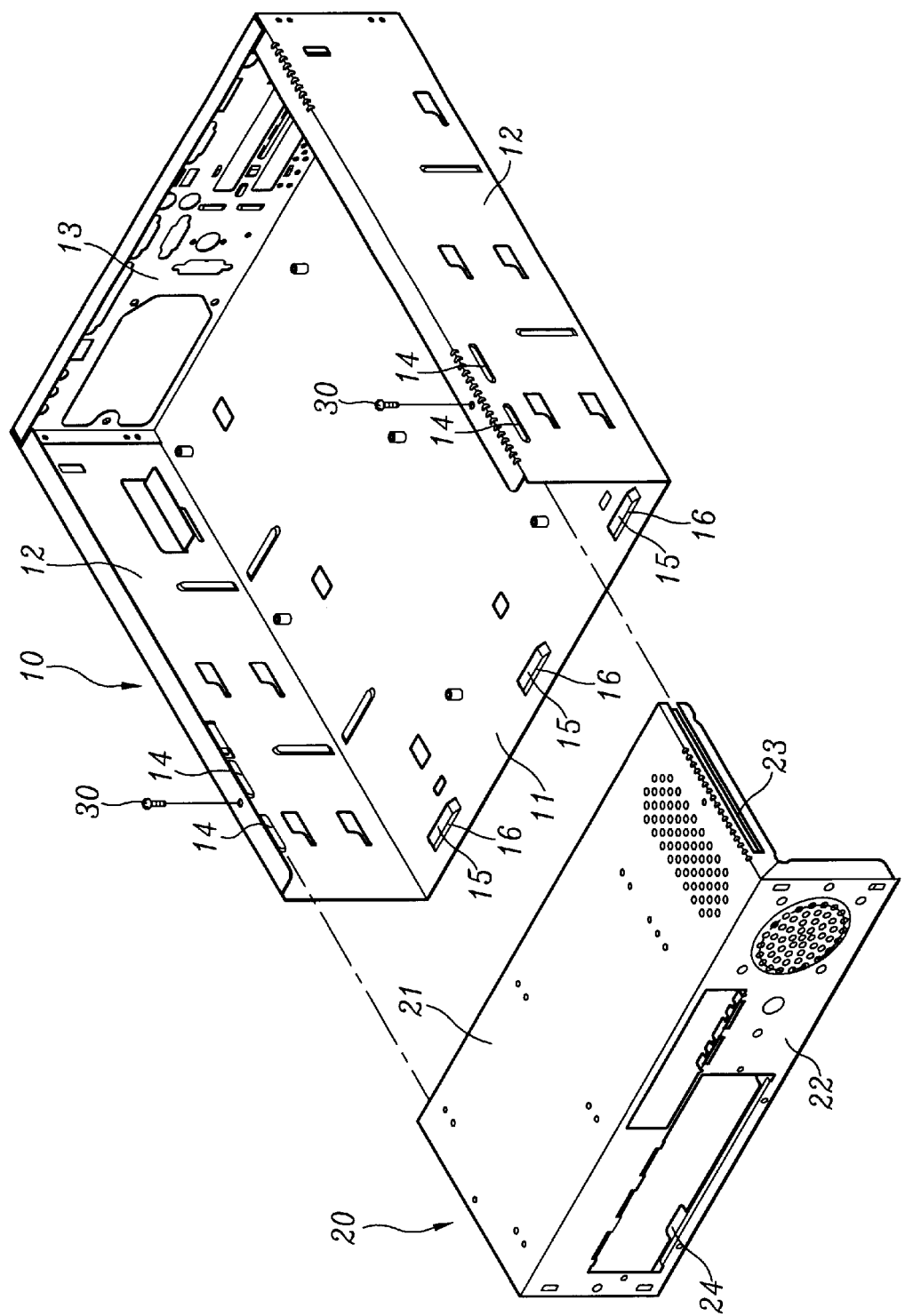
FIG. 3 shows the exploded view of the invention
Figure 4:
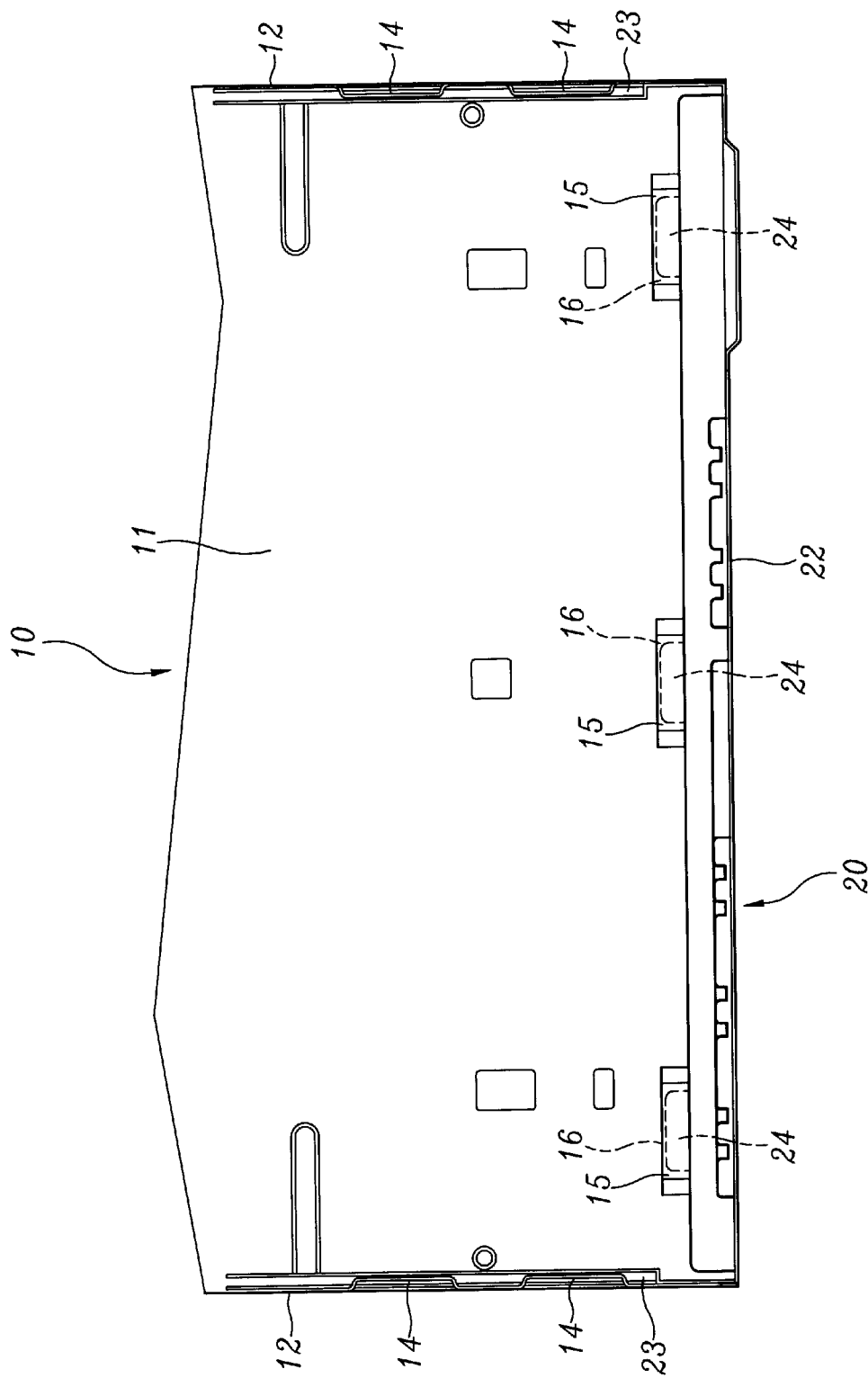
FIG. 4 shows the planar view of the invention.

With reference to FIGS. 2–4, the detachable computer case according to the present invention comprises a mainboard rack 10 and a detachable board 20. The mainboard rack 10 is a rectangular housing with open front side and top side. The mainboard rack 10 has a base 11, two lateral plates 12 and a rear plate 13. The base 11 is a flat plate and used to support computer mainboard, power supply and other equipment. The lateral plates 12 vertically extend from two lateral sides of the base 11. The rear plate 13 vertically extends from the bottom side of the base 11. A plurality of guiding rails 14 are formed by pressing and project from the upper inner wall of the lateral plates 12, and extend horizontally. A plurality locking stages 15 are formed on the top side of the base 11 by pressing and each has a locking hole 16 therein.

The detachable board 20 is of inverted-L shape, and has a top plate 21 and a front plate 22. The top plate 21 is a horizontal plate and the front plate 22 is arranged on the front end of the top plate 21. The front plate 22 is a vertical plate and can be functioned as the front panel of computer used to mount hard disk, floppy disk or CDROM driver. An indent guiding groove 23 is formed by pressing on the outer wall of two sides of the top plate 21. The guiding groove 23 extends horizontally and is corresponding to the guiding rail 14 of the mainboard rack 10. A plurality of horizontally extending locking plates 24 have a predetermined length and are corresponding to the locking hole 16 of the mainboard rack 10.

When the detachable board 20 is to be engaged with the mainboard rack 10. the guiding grooves 23 on two lateral sides of the top plate 21 of the detachable board 20 slide backward along the guiding rails 14 on two lateral plates 12 of the mainboard rack 10. In this way, the detachable board 20 is engaged with the mainboard rack 10. Before the detachable board 20 is slid to a fixed point the locking plates 24 on the bottom end of the front plate 22 of the detachable board 20 are engaged to the corresponding locking holes 16 of the mainboard rack 10, such that the detachable board 20 is engaged with the mainboard rack 10. Moreover, the detachable board 20 can be engaged with the mainboard rack 10 by a screw 30.

The present invention provides a computer case, which facilitates the replacement, update and maintenance of computer equipment. The detachable board 20 is of inverted-L shape, i.e., adopts a bottom-less design. The detachable board 20 will not occupy the front portion of the base 11 of the mainboard rack 10 when being engaged with the mainboard rack 10. Therefor, the present invention provides more flexibility to the space and arrangement of the mainboard plate.

Although the present invention has been described with reference to the preferred embodiment thereof, it will be understood that the invention is not limited to the details thereof Various substitutions and modifications have suggested in the foregoing description, and other will occur to those of ordinary skill in the art. There, all such substitution and modification are intended to be embraced within the scope of the invention as defined in the appended claims.

I claim:

1. A detachable computer case comprising:
    a mainboard rack having a base, two lateral plates and a rear plate; a plurality of guiding rails formed by pressing and projecting from the upper inner wall of said lateral plates; a plurality locking stages formed on the top side of said base by pressing and each having a locking hole therein;

a detachable board being of inverted-L shape, and having a top plate and a front plate; an indent guiding groove formed by pressing on the outer wall of each lateral side of said top plate; a plurality of locking plates formed on the bottom end of said front plate;

whereby said guiding grooves on two lateral sides of said top plate of said detachable board slide backward along said guiding rails on two lateral plates of said mainboard rack, and said locking plates on the bottom end of said front plate of said detachable board are engaged to the corresponding locking holes of said mainboard rack, such that said detachable board is engaged with said mainboard rack.

2. The detachable computer case as in claim 1, wherein said detachable board is engaged with said mainboard rack by a screw.

3. The detachable computer case as in claim 1, wherein said guiding rails on two lateral plates of said mainboard rack extend horizontally, and said guiding grooves on two lateral sides of said top plate of said detachable board also extend horizontally.

\* \* \* \* \*